Feb. 5, 1929.
F. HORNQUIST
CHILD'S VEHICLE
Filed Aug. 23, 1926
1,701,410
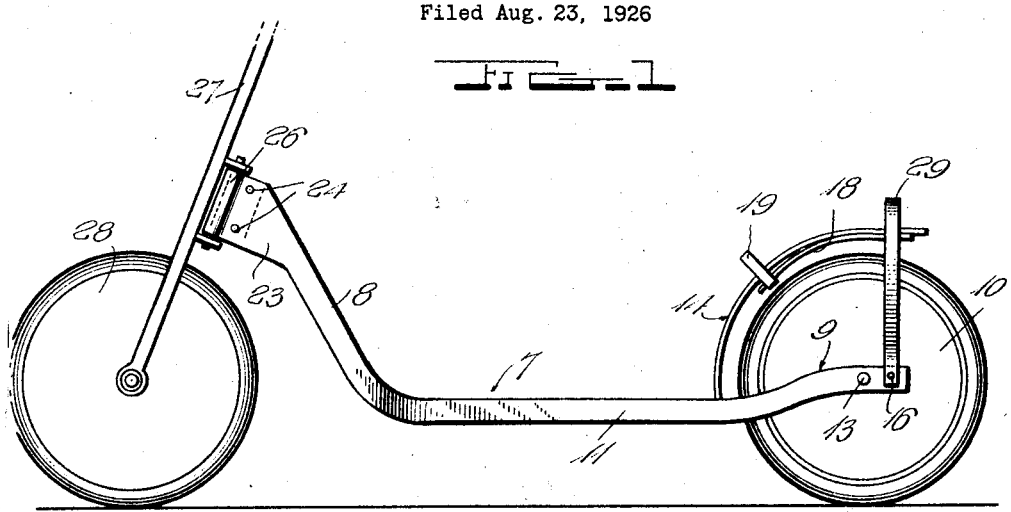
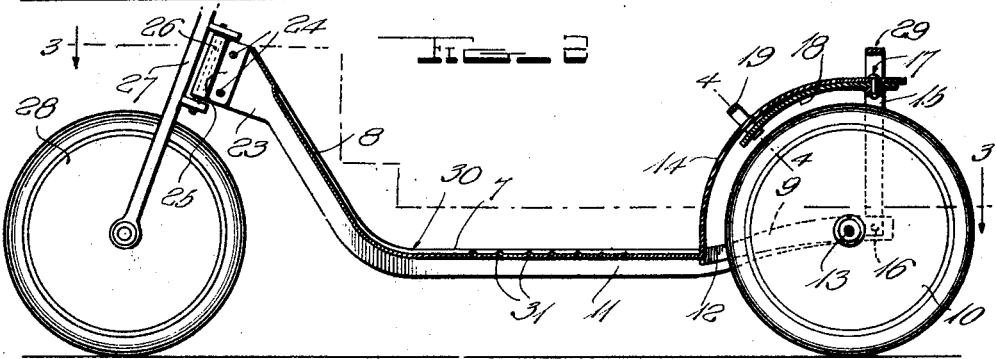
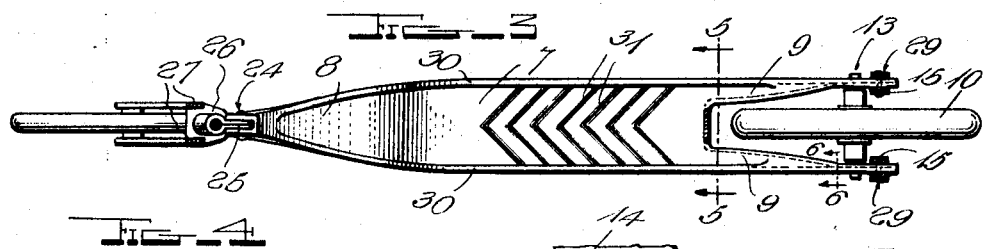
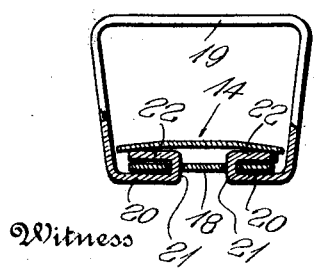
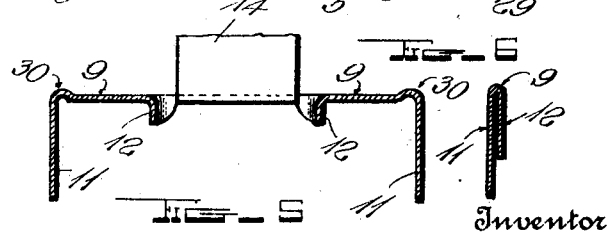
Inventor
Frank Hornquist,
Witness Patented Feb. 5, 1929.

1,701,410

UNITED STATES PATENT OFFICE.

FRANK HORNQUIST, OF MOUNT JEWETT, PENNSYLVANIA.

CHILD'S VEHICLE.

Application filed August 23, 1926. Serial No. 130,973.

The invention relates to improvements in children's vehicles of the type commonly known as scooters. Vehicles of this type commonly comprise a front wheel, a steering post rising therefrom, a horizontally elongated body having an upturned front end pivoted to the steering post and a bifurcated rear end, and a rear wheel mounted between the furcations or arms of said rear end of the body. It is one object of the invention to provide a new and improved body whose major portion is pressed from a single sheet metal blank, in such manner that it will possess the necessary rigidity, regardless of the fact that forming the device in this manner permits exceptionally easy and inexpensive manufacture.

Scooters are very often provided with a fender over the rear wheel, and it is a further aim of my invention to produce such a fender at the time of pressing the sheet metal blank into the proper shape for the body, the fender being thus integrally joined to the body.

With the foregoing and minor objects in view, the invention resides in the novel subject matter hereinafter described and claimed, the description being supplemental by the accompanying drawings.

Figure 1 is a side elevation of a scooter constructed in accordance with my invention.

Fig. 2 is a central vertical longitudinal section, partly in elevation.

Fig. 3 is a horizontal sectional view on line 3—3 of Fig. 2.

Fig. 4 is a vertical transverse section on line 4—4 of Fig. 2.

Figs. 5 and 6 are transverse sectional views on the correspondingly numbered lines of Fig. 3.

The body of the scooter comprises a horizontally elongated metal plate 7 having a forwardly inclined front end 8 which gradually narrows towards its front end. The rear end of the plate 7 is bifurcated to provide a pair of laterally spaced arms 9 to straddle the rear wheel 10, and the side edges of said plate are downwardly bent, from the front extremity of the portion 8 to the rear extremities of the arms 9, providing reenforcing flanges 11 which effectively stiffen the plate against bending under the weight of the user.

The inner edge portions of the arms 9 are downwardly bent to provide reenforcing flanges 12 which rearwardly converge with the rear ends of the flanges 11 and at the rear portions of said arms, lie substantially against said flanges 11, as will be clear from Figs. 3 and 6. These two sets of flanges are formed with aligned openings receiving the rear axle 13 of the wheel 10.

An upwardly and rearwardly curved fender 14 is provided for the wheel 10, and while the lower end of this fender could be riveted or otherwise secured to the plate 7, said fender is preferably integral with said plate and formed from the metal between the arms 9, it being of course understood that the metal blank from which the body is to be formed, must then be provided with a portion extending rearwardly beyond the portions which eventually form said arms 9, said rearwardly extending portion constituting the rear portion of the fender 14, when the latter is bent to shape.

An arched supporting bar 15 has its ends secured to the rear extremities of the arms 9, by rivets 16, said bar straddling the wheel 10 and being secured to the rear end of the fender 14 by a rivet 17. This rivet 17, in the present showing, also anchors the rear end of a brake spring 18, said spring underlying the fender 14 and having its rear extremity positioned between said fender and the crown of the bar 15. The front end of the spring 18 is provided with means projecting outwardly beyond the fender to be engaged by one of the user's feet, so that he may inwardly press the spring into contact with the tire of the wheel 10, to effect a braking action.

Preferably, the depressing means for the spring 18, is in the form of an arched yoke 19, said yoke straddling the fender and the spring and having its ends 20 bent inwardly under said spring. This spring is formed with slots 21 and portions of the ends 20 are passed upwardly through these slots and then clinched at 22 upon the upper side of the spring, this construction being fully shown in Fig. 4. By making use of the yoke 19, it will be observed that a simple and inexpensive construction is provided and one which will hold the front end of the spring 18 against swinging about the rivet 17 as a pivot.

The front ends of the flanges 11 are widened as at 23 and are secured by rivets or the like 24 to flanges 25 which project rearwardly from a bearing 26. This bearing is pivotally connected in any desired manner with a steering post 27 rising from a front wheel 28.

Preferably, a U-shaped stand 29 is provided for the rear end of the scooter, and it may well be pivoted to the arms 9, by means of the rivets 16. This stand is shown in the same transverse plane with the arched bar 15, but this is only one of the many positions which it may occupy when it is not in use to support the rear end of the vehicle.

If desired, ridges 30 may be formed along the body portion of the plate 7, at its juncture with the flanges 11, and transverse V-shaped ridges 31 may be upwardly stamped from said plate. These formations assist in preventing slippage of the user's feet upon the body and they also impart an attractive, finished appearance to the device.

The exact details herein disclosed have proven to be very desirable from numerous points of view and they are preferably followed. However, within the scope of the invention as claimed, variations may be made.

I claim:

In a scooter construction, a one-piece stamped metal body comprising a horizontally elongated plate having a forwardly inclined front end and having the central longitudinal portion of its rear end cut from the longitudinal plate portions at opposite sides of said central portion and curved upwardly and rearwardly to provide a wheel fender, said plate portions at opposite sides of said central portion being left in substantially horizontal positions to provide fork arms to straddle a rear wheel, said plate having its longitudinal edges bent downwardly from the front extremity of said inclined end to the rear extremities of said arms, providing reinforcing flanges whose front ends are vertically widened and separated from each other, a steering post bearing having a rearwardly projecting vertically disposed portion received between and in contact with said widened flange ends, and fasteners passing through said widened flange ends and through said bearing portion, the inner edges of the aforesaid fork arms being downwardly bent and at their rear extremities lying substantially against the inner sides of said flanges, the rear ends of said downwardly bent arm portions and said flanges being formed with transversely alined openings to receive a rear axle.

In testimony whereof I have hereunto affixed my signature.

FRANK HORNQUIST.